United States Patent [19]

Farrell

[11] 3,824,062

[45] July 16, 1974

[54] TRACK-TYPE MOLDING APPARATUS AND CARRIAGE MEANS THEREFOR

[75] Inventor: Robert E. Farrell, Nashua, N.H.

[73] Assignee: Improved Machinery Inc., Nashua, N.H.

[22] Filed: Jan. 29, 1973

[21] Appl. No.: 327,300

[52] U.S. Cl.................... 425/451, 425/DIG. 221
[51] Int. Cl............................................. B29g 3/00
[58] Field of Search .......... 425/450, 451, 468, 404, 425/DIG. 200, DIG. 201, DIG. 221, DIG. 223

[56] References Cited
UNITED STATES PATENTS

| | | | |
|---|---|---|---|
| 3,606,641 | 9/1971 | Carrieri et al. ............ | 425/DIG. 223 |
| 3,669,599 | 6/1972 | Snider et al.......................... | 425/450 |
| 3,712,771 | 1/1973 | White et al. ......................... | 425/451 |

Primary Examiner—Richard J. Herbst
Attorney, Agent, or Firm—Robert R. Pacquin

[57] ABSTRACT

Molding apparatus comprising track means defining a predetermined path or circuit, a plurality of work stations associated with the track means, and mold-carrying carriages driven along the track means and through the work stations. The carriages each include a plurality of relatively movable carriage platens which, during the carriage movement along the track means, are locked in closed positions by locking means including cooperative jaws and locking elements or collars mounted on axially movable locking rods. Also, the track means includes successive straight and curved sections which are in different planes to prevent their simultaneous engagement with a thereover passing carriage, thereby minimizing wear during the carriage movement.

15 Claims, 10 Drawing Figures

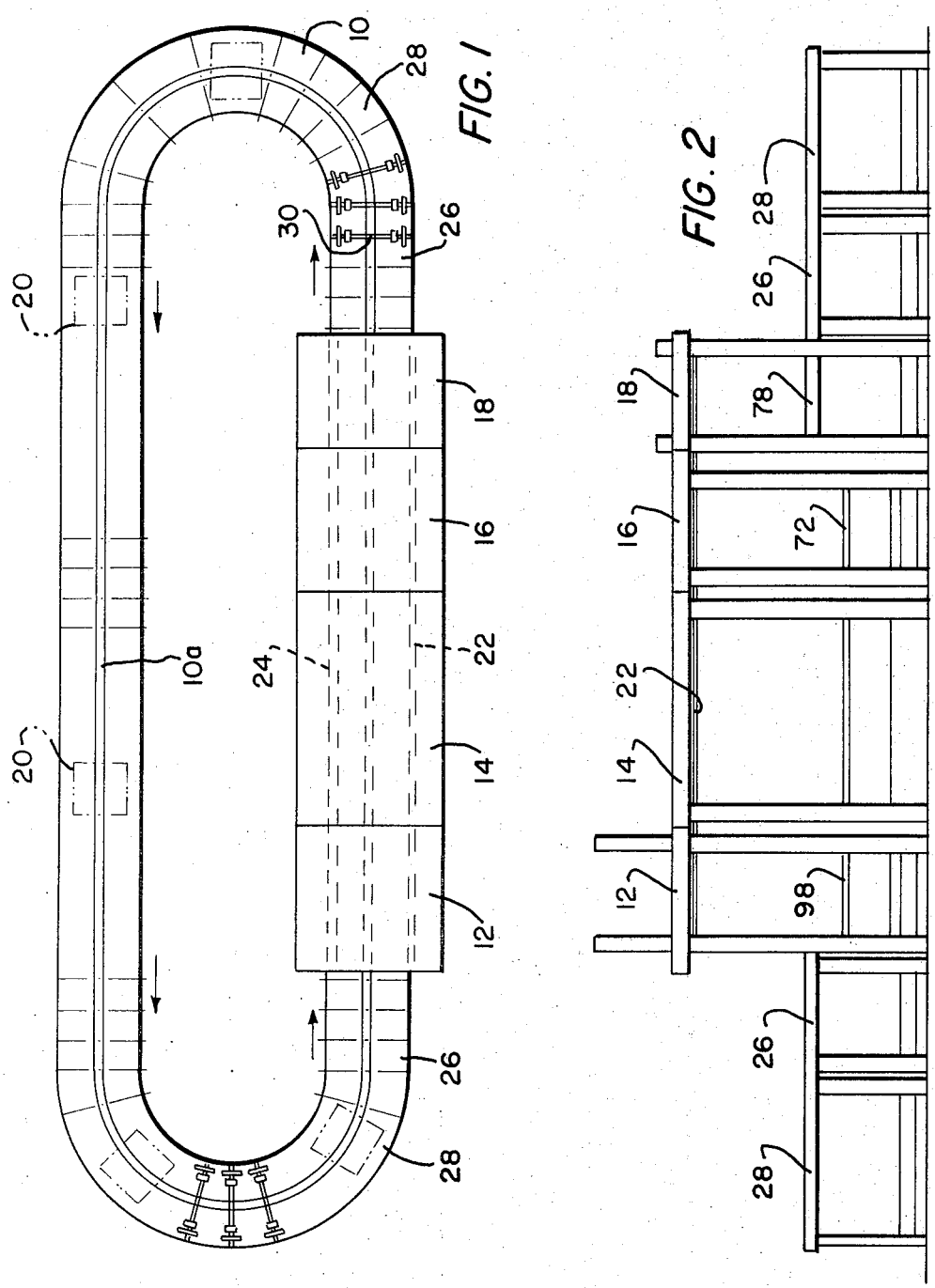

TRACK-TYPE MOLDING APPARATUS AND CARRIAGE MEANS THEREFOR

The present invention relates to molding apparatus of the type including mold-carrying carriage means driven along track means and through work station means associated with the track means, and to carriage means for molding apparatus of such type.

An object of the present invention is to provide new and improved molding apparatus of the type set forth which is particularly adapted for employment in the molding of relatively thick plastic articles and other plastic articles requiring a relatively long time period for their curing or setting.

Another object of the invention is to provide new and improved molding apparatus of the type set forth which, although particularly intended for compression molding of plastic material, is readily adaptable for employment in injection molding and other molding processes.

Another object is to provide molding apparatus of the type set forth wherein the carriage means includes new and improved locking means for locking a carried mold closed during the movement of the carriage means along the track means.

Another object is to provide molding apparatus of the type set forth wherein the work station means includes new and improved means cooperative with such locking means for providing locking and unlocking of the latter.

Another object is to provide molding apparatus of the type set forth which comprises new and improved track means particularly adapted to minimize wear during the movement of the carriage means between straight and curved sections thereof.

Another object is to provide new and improved carriage means for holding apparatus of the type set forth, which carriage means includes new and improved locking means for locking a carried mold closed.

Other objects and advantages of the invention will be apparent from the following description taken in connection with the accompanying drawings wherein, as will be understood, the preferred embodiment of the invention has been given by way of illustration only.

In accordance with the invention, a molding apparatus may comprise track means defining a predetermined path, work station means associated with the track means, and at least one carriage means movable along the track means, the carriage means including a plurality of platens relatively movable between open and closed position, the carriage means further including locking means for locking the platens in their said closed positions, the locking means comprising jaw means, locking element means adapted to cooperate with the jaw means for so locking the platens and movable into and out of a position wherein the locking element means is cooperative with the jaw means for such locking, and locking rod means operable for causing the locking elements means to so move.

Also, in accordance with the invention the track means of the molding apparatus may comprise adjacent straight and curved sections on which the carriage means rides during its movement along the track means, such straight and curved sections being relatively arranged to prevent their simultaneous engagement with the carriage means during its movement thereover.

Referring to the drawings:

FIG. 1 is a top plan view illustrating a molding apparatus constructed in accordance with one embodiment of the invention;

FIG. 2 is an elevational side view of the molding apparatus shown in FIG. 1;

Figure 3:
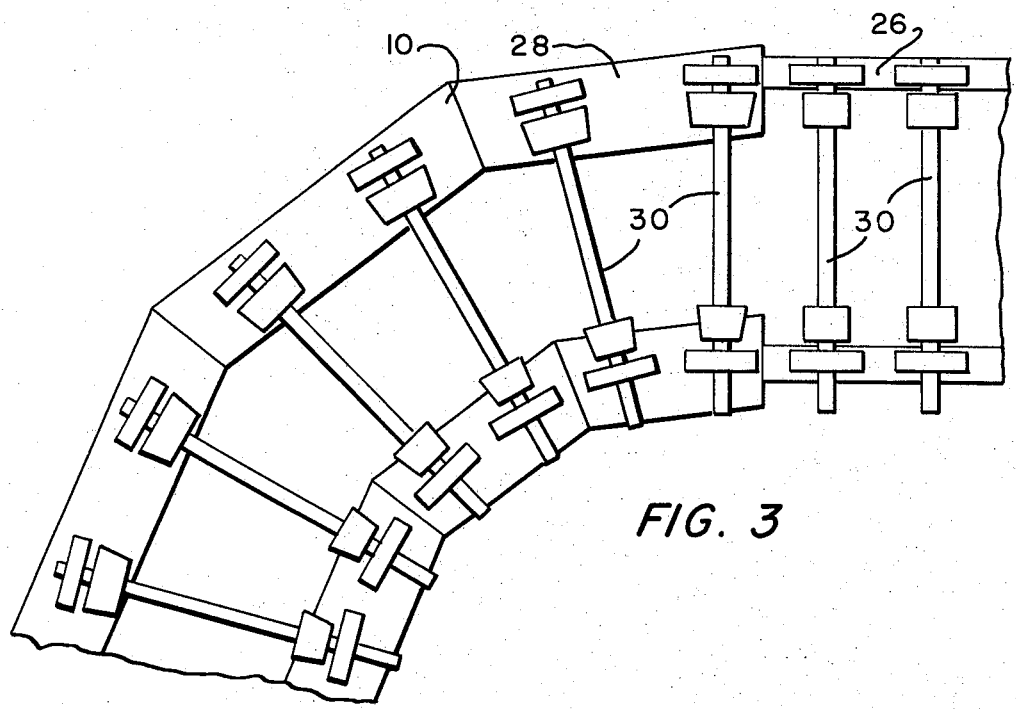
FIG. 3 is an enlarged top or plan view of a portion of the track means of such molding machine.

Referring more particularly to the drawings wherein similar reference characters designate corresponding parts throughout the several drawings, the illustrated molding apparatus is particularly adapted to the compression molding of plastic articles and particularly constructed to provide a relatively long curing or setting time for the compression molded articles. As will become apparent from the following description, however, the molding apparatus provided by the invention is not limited to use in compression molding of plastic articles, but rather is alternatively employable in injection and other plastic molding processes, particularly when thick-walled articles or other articles requiring long curing or setting times are to be formed.

As shown in FIGS. 1 and 2, the illustrated molding apparatus comprises a generally "C"-shaped track or track means 10 defining a predetermined path or circuit, a plurality of work stations 12, 14, 16, 18 associated with the track 10, and a plurality of mold-carrying carriages or carriage means 20 movable along the track 10 and through the work stations 12, 14, 16, 18. Also, as shown in such FIGS. 1 and 2, a plurality of overhead supporting rails 22, 24 extend through the work stations 12, 14, 16, 18 for supporting the upper ends of the carriages 20 while the carriages 20 are in the work stations 12, 14, 16, 18; and an overhead power source, schematically depicted as 10a in FIG. 1, extends throughout the length of the track 10 and through the work stations 12, 14, 16, 18 for providing electrical power to the carriages 20 for temperature control (that is, heating or cooling) of their carried molds.

The track 10 is formed by ground mounted straight and curved track sections designated generally as 26 and 28, respectively, which are relatively arranged to provide the track 10 with its before-described generally "C"-shaped configuration. The track sections 26, 28, as shown in FIGS. 1 and 3, each comprise a plurality of roller assemblies 30 which directly support the lower ends of the carriages 20 during their movement along the track 10; and at least a majority of such roller assemblies 30 are rotatably driven to drive the carriages 20 along the track 10 in the direction indicated by the arrows shown adjacent to the track 10 in FIG. 1. Adjacent ones of the straight and curved track sections 26, 28 are in different planes to prevent simultaneous engagement of the rollers 30 of such adjacent track sections 26, 28 with the thereover driven carriages 20. More particularly, each curved track section 28 immediately following a straight track section 26 is in a plane slightly sloping downwardly from the plane of the immediately preceeding straight track section 26; and each curved track section 28 immediately preceeding a straight track section 26 is in a plane slightly sloping upwardly towards the plane of the following straight track section 28. The entire 180° of each curve of the track 10, however, is in a single plane. Hence, the wear resulting from the transition of the carriages 20 between successive straight and curved track sections 26, 28 is resultantly substantially minimized.

The carriages 20 may be of any suitable number, five thereof being shown in broken lines external to the work stations 12, 14, 16, 18 in FIG. 1, and are all of identical construction. Hence, although only the details of a single one of the carriages 20 have been shown in FIGS. 4 through 6 and hereinafter will be described, it will be understood that all of the carriages 20 are identical to that so shown and described. The illustrated carriage 20 comprises a generally horizontally extending upper carriage platen 32 carrying trolley wheels 34 adapted for supporting such upper carriage platen 32 on the rails 22, 24, and a generally horizontally extending, lower carriage platen 36 directly supported by the roller assemblies 30 of the track 10 during the carriage movement along the later. The carriage platens 32, 36 are adapted to fixedly carry mating mold halves or sections shown in broken lines as 38, 40 in FIGS. 4, 5, and 10, and are relatively vertically movable between adjacent or closed positions wherein the mold sections 38, 40 are closed and remote or open positions wherein the mold sections 38, 40 are spaced apart or open. The carriage platen 32 carries a plurality of electrical collectors 32a arranged to be electrically connected to the power source 10(a) during the carriage movement, the collectors 32a being also electrically connected in a conventional manner to conventional cartridge heaters (not shown) which are associated with the mold sections 38, 40 for heating the latter. The carriage platens 32, 36 are interconnected adjacent opposite ends for such relative movement by hollow, generally vertical guide tube assemblies 42, each comprising a hollow upper guide tube 44 affixed to the upper carriage platen 32 and a therein telescoping hollow lower guide tube 46 fixedly mounted to the lower carriage platen 36 through a mounting element 48. As illustrated, only a single one of the guide tube assemblies 42 is provided adjacent each of said opposite ends of the carriage platens 32, 36; however, as will be understood, a plurality of the assemblies 42 could, if desired, be provided at each of said opposite ends.

Figure 6:
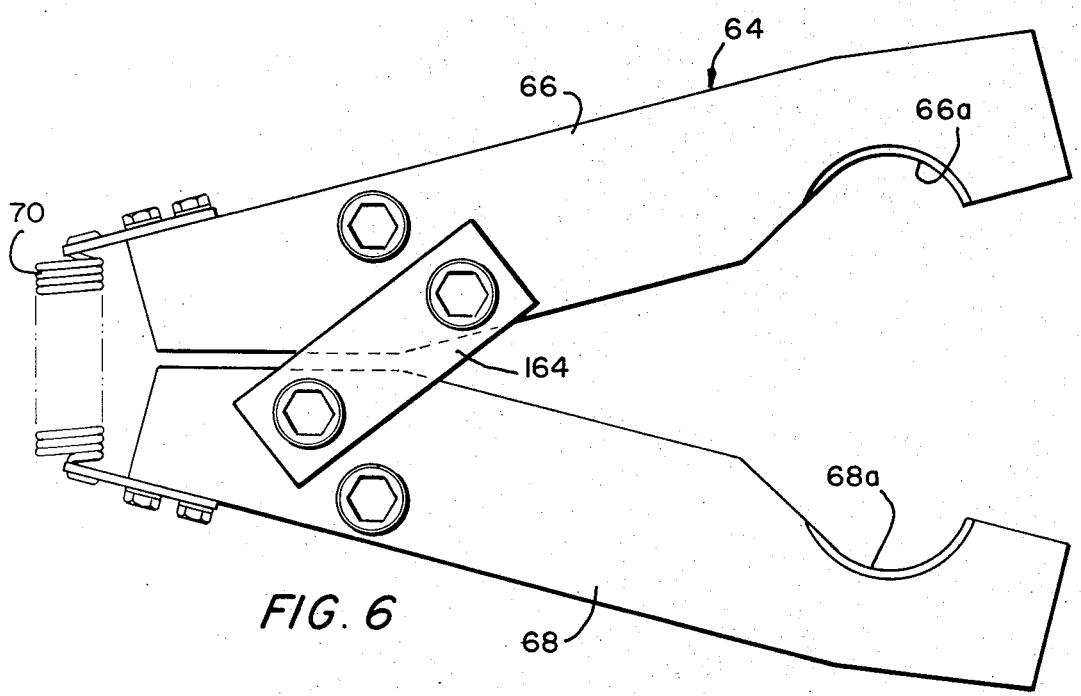
FIG. 6 is a substantially enlarged, top vew of a portion of one of the locking means of such carriage means.
Figure 4:
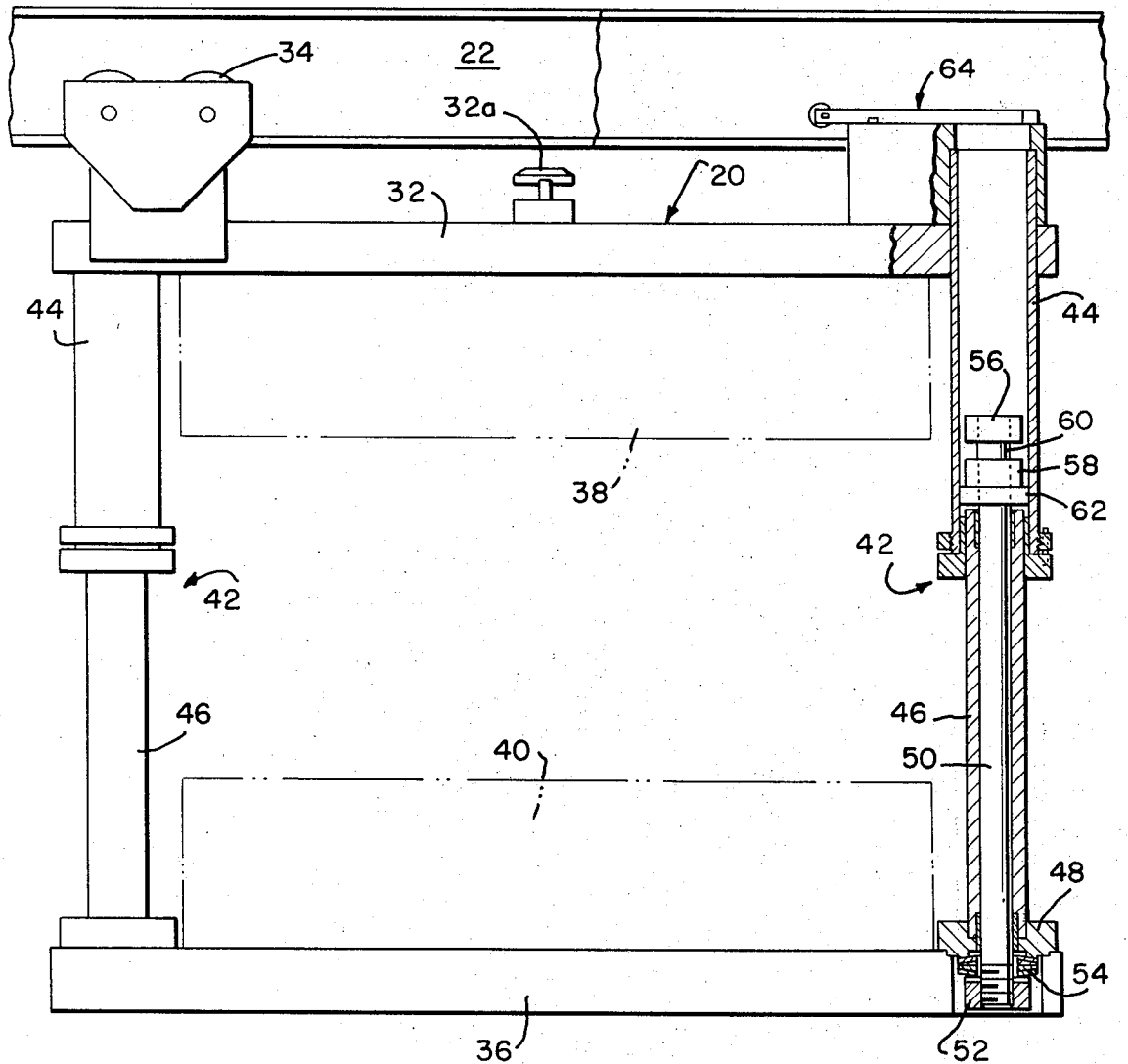
FIG. 4 is an elevational side view, partially broken away and in section and with the mold sections shown in phantom, of one of the carriage means of such molding apparatus.
Figure 5:
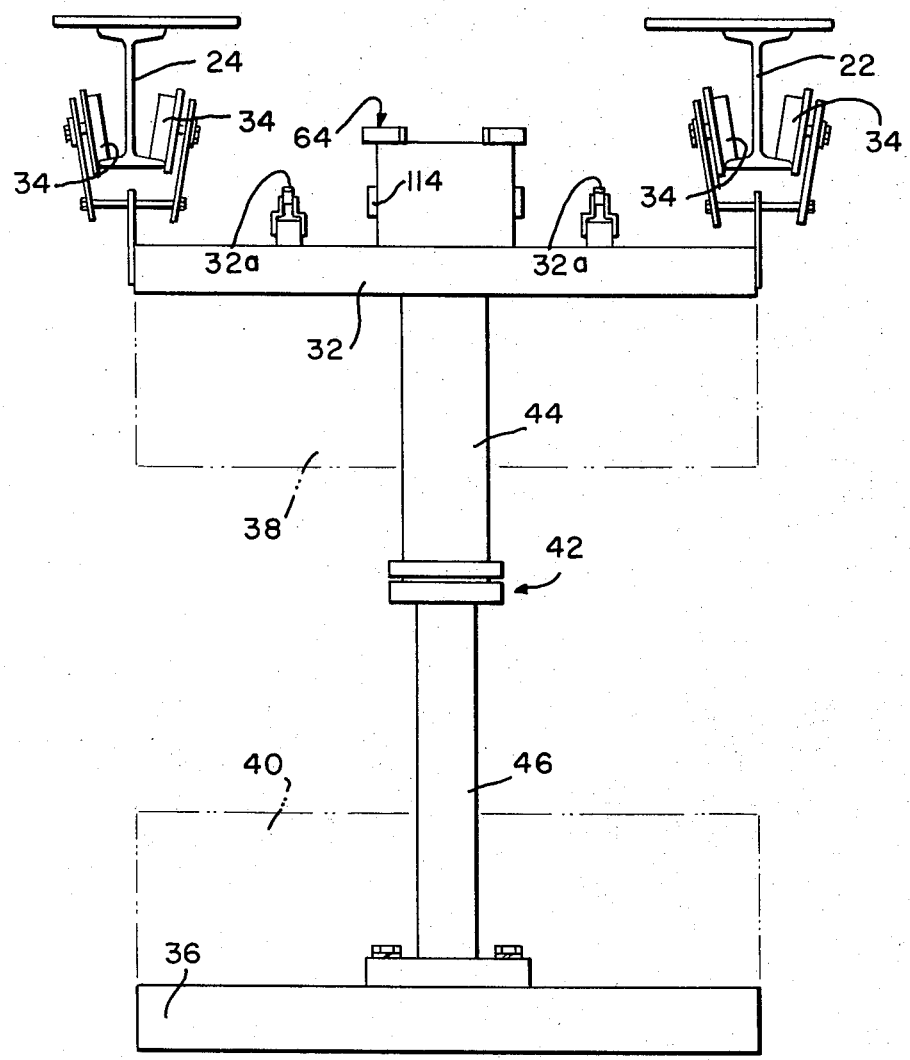
FIG. 5 is an elevational end view, with the mold sections again shown in phantom, of said carriage means.

The illustrated carriage 20 further comprises a plurality of locking means for locking or latching the carriage platens 32, 34 in their before described closed positions, thereby permitting curing or setting of a plastic article between the closed mold sections 38, 40 during the carriage travel along the track 10. Each of the guide tube assemblies 42 is provided with one of such locking means; and each such locking means comprises an elongated, at least generally vertical locking rod 50 axially slidably disposed in the corresponding one of the guide tube assemblies 42. Each locking rod so is of sufficient length such that, with the carriage platens 32, 36 in their open positions as shown in FIGS. 4 and 5, it extends completely through the surrounding lower guide tube 46 and has its upper and lower ends in the upper guide tube 44 and below the mounting element 48, respectively. The lower end of each locking rod 50 threadly carries a retaining element or nut 52 restricting or limiting upward movement of the locking rod 50 relative to the upper carriage platen 36; and each locking rod 50 is downwardly biased by a spring 54 located between such retaining member 52 and the thereabove mounting element 48. The upper end of each locking rod 50 fixedly carries a locking collar or element 56 and a second or restraining collar 58 spaced below the locking collar 56 by a relatively short portion 60 of the length of the rod 50. Immediately below its carried restraining collar 58 each locking rod 50 is provided with a bearing element 62, the restraining collars 58 acting through their respective adjacent bearing elements 62 on the upper ends of the lower guide tubes 46 to restrict the downward movement of the locking rods 50 and preload the springs 54. The upper carriage platen 32 carries jaw means, designated generally as 64, above the open upper end of each of the upper guide tubes 44; and, as best shown in FIG. 6, each of such jaw means 64 comprises a pair of jaw elements 66, 68 including jaw portions 66a, 68a cooperative to extend around the short length portion 60 of the corresponding locking rod 50. The jaw elements 66, 68 of each of the jaw means 64 are interconnected by a coil spring 70 which biases the jaw portions 66a, 68a from one another, whereby the jaws 66, 68 are normally in the open position illustrated in FIG. 6, and a link 164 is provided for causing the jaw 68 to act in unison with the jaw 66 when the latter is moved against the spring 70 to partially encircle the short length portion 60, the jaws 66, 68 being pivotally movable relative to such link 164.

The carriage means 20 is, as beforedescribed, illustrated in FIGS. 4 and 5 with the carriage platens 32, 36 in their open positions wherein the upper ends of the locking rods 50 are contained within the upper guide tubes 44. The locking of the carriage platens 32, 36 is performed after such carriage platens 32, 36 have been relatively vertically moved to their closed positions, wherein the lower guide tubes 46 are in extreme retracted positions in the upper guide tubes 44. During such locking, the locking rods 50 are upwardly, axially driven (such as, by external forces applied to their lower ends) against the springs 54 until the locking collars 56 are above the normally open jaw means 64 and the rod portions 60 are aligned with the jaw portions 66a, 68a of the jaws 66, 68. Then, each pair of the cooperating pairs of jaws 66, 68 is driven by an externally applied force to close the jaw portions 66a, 68a around the rod lengths 60, whereupon the axial driving forces on the rods 50 are relieved to permit the annular lower surfaces of the locking collars 56 to fall onto the upper surfaces of the jaw means 64. The frictional engagement between the lower surfaces of the locking collars 56 and the upper surfaces of the jaw means 64 serves to thereafter maintain the jaws 66, 68 closed around the rod portions 60; and the carriage platens 32, 36 are resultantly thereby locked in their closed positions. The unlocking of the carriage platens 32, 36 comprises axially upwardly driving the locking rods 50 (such as, by external forces again applied to their lower ends) against the springs 54 to raise the lower surfaces of the locking collars 56 from the upper surfaces of the jaw means 64 whereupon the springs 70 re-open the jaw means 64. The locking rods 50 are then axially driven downwardly (such as, by external force applied to their upper ends) to cause the platens 32, 36 to be driven one from the other to their open positions (shown in FIGS. 4 and 5) wherein the upper ends of the locking rods 50 are again contained within the upper guide tubes 44 and the restraiNing collars 58 prevent further downward movement of the locking rods 50 relative to the carriage platens 32, 36.

Figure 8:
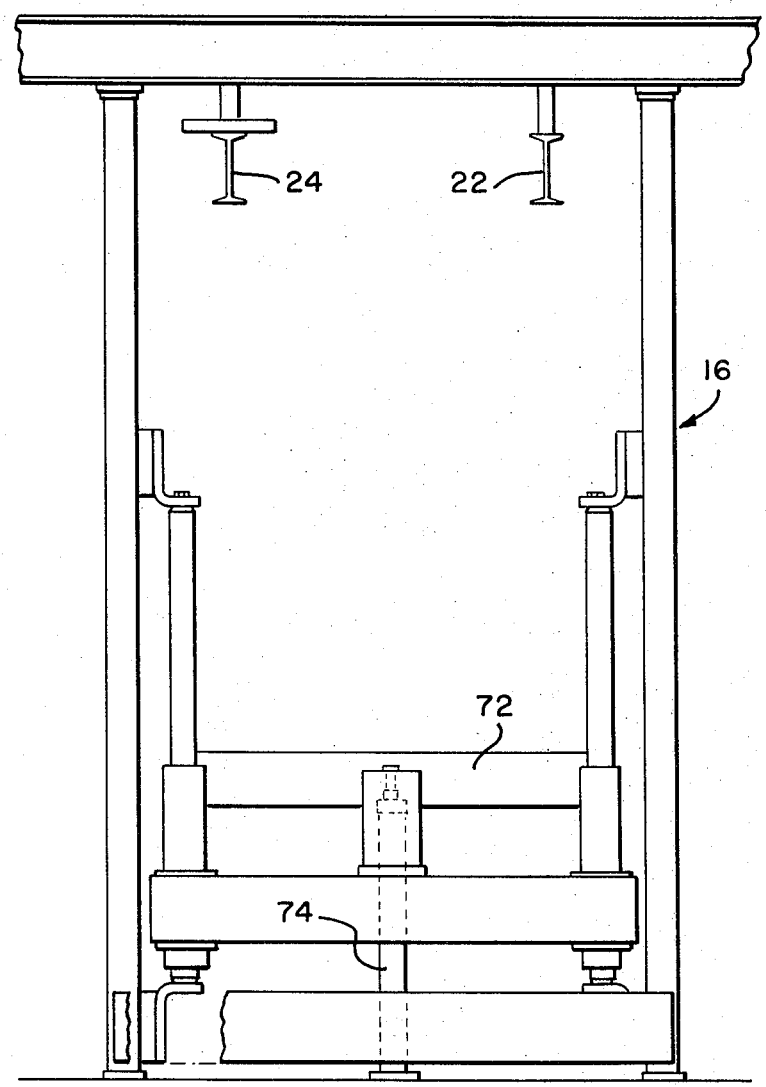
FIG. 8 is an elevational end view of the mold preclosing, work station of the apparatus.
Figure 9:
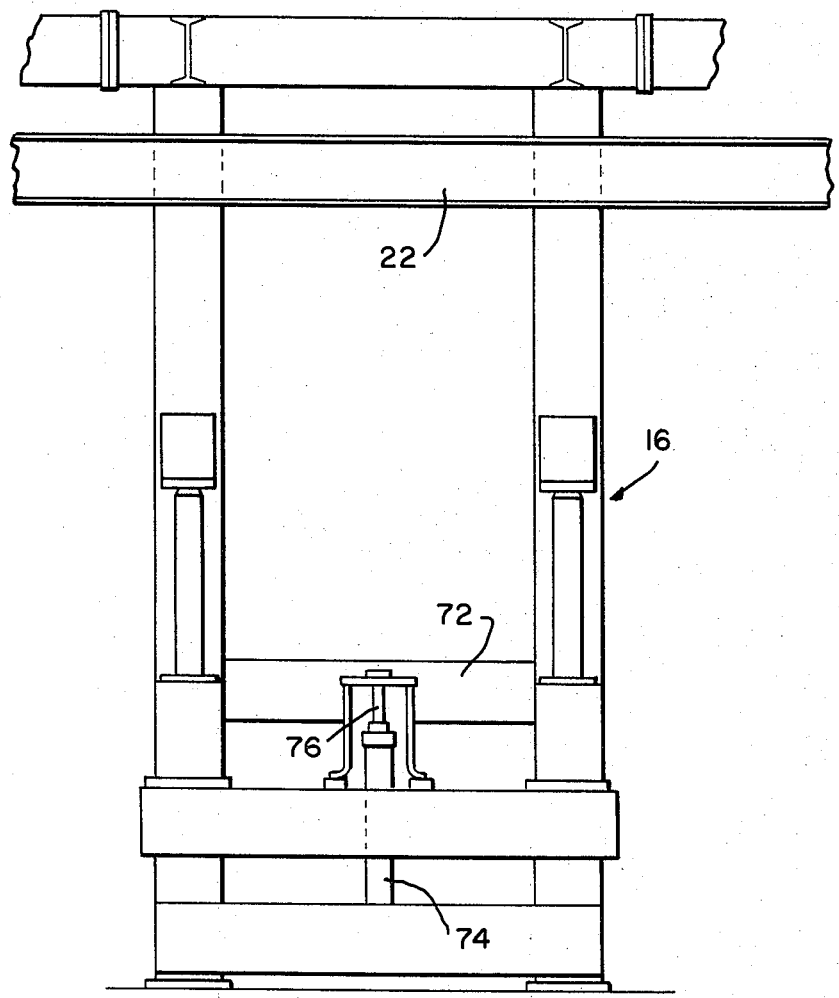
FIG. 9 is an elevational side view of such mold preclosing work station.

Referring to the work station means of the apparatus, the work station 16 is both a loading station wherein the sheets of plastic material to be compression molded are manually inserted between the open, carriage carried, mold sections 38, 40 and also a pre-closing station for partially closing the carriage platens 32, 36 (and hence the mold sections 38, 40) prior to transferring such to the succeeding work station 18. As shown in FIGS. 8 and 9, the loading and preclosing station 16 comprises a roll case 78 containing roller assemblies (not shown) similar to the before described rollers 30 of the track 10, the roll case 78 directly supporting the lower ends of the carriages 20 while the latter are in the station 16 and the rollers of such case 78 being selectively rotatable driven for transferring the carriages 20 from the station 16. The station 16 further comprises a hydraulic actuator 74 including a piston 76 operatively connected to the roll case 78 for raising the latter to provide the before mentioned partial closing of the carriage platens 32, 36, and for also lowering such roll case 78 into position for receiving the carriages 20 from the preceeding work station 14.

Figure 10:
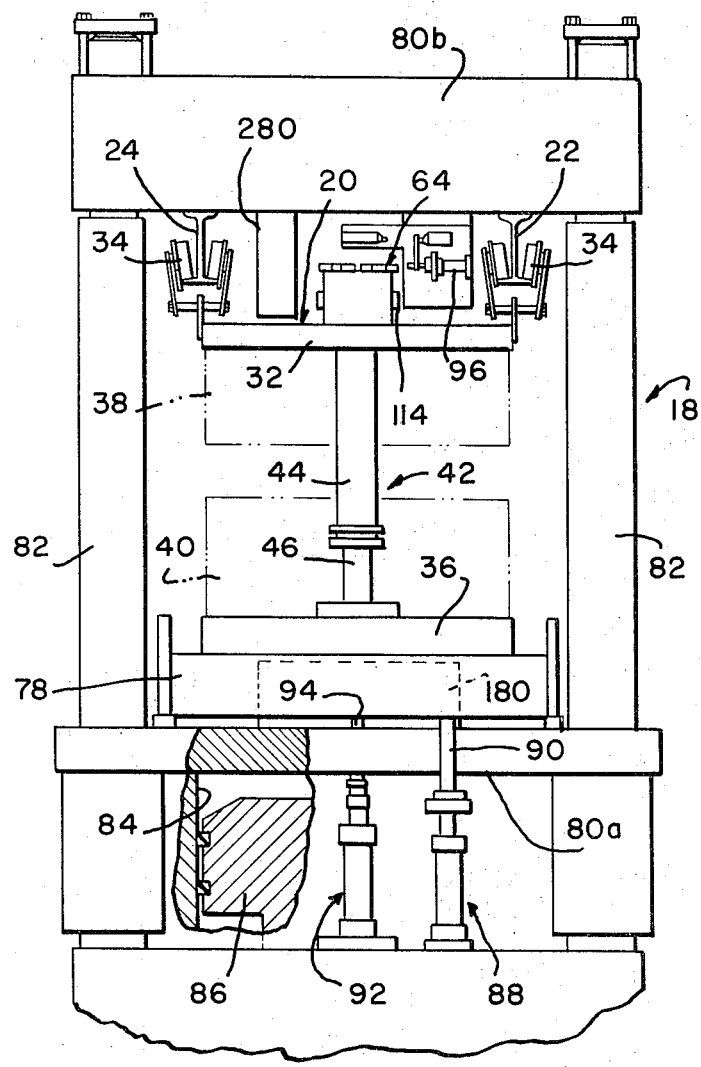
FIG. 10 is an elevational end view, partially broken away and in section of the press-and-locking station of the apparatus.

The work station 18 comprises a press for closing the carriage platens 32, 36 (and hence their carried mold sections 38, 40) and applying pressing force for compression forming the plastic sheets to the configuration dictated by the mold sections 38, 40. In addition, the station 18 also comprises means for causing the locking means of the carriages 20 to lock the carriage platens 32, 36 in their closed positions prior to discharge of the carriages 20 to the track 10 where the compression formed articles are cured during the carriage travel therealong. As illustrated in FIG. 10, the station 18 comprises a roll case 78 carrying roller assemblies (not shown) similar to the before described roller assemblies 30, such roller assemblies being selectively rotatably driven for transfer of the carriages 20 from the station 18. The roll case 78 is supported by a plurality of hydraulic actuators 88 through their rod extensions 90, the actuators 88 being adapted to vertically move the roll case 78 whereby a carriage 20 received by the station 18 in partially closed condition may be discharged by the station in closed and locked condition. Also, as illustrated, the station 18 comprises a movable or lower press platen 80a and a fixed or upper press platen 80b, the movable platen 80a being slidably mounted for vertical movement on generally vertical strain rods 82. The movable platen 80a contains a cylinder 84 having therein a large, stationary ram 86 and is upwardly moved by pressurized fluid supplied to the cylinder 84 above the ram 86. The upper surface of the movable platen 80a fixedly carries a plurality of bolsters 180 adapted to move upwardly between the roller assemblies of the roll case 78; and the lower surface of the fixed platen 80b fixedly carries a plurality of depending bolsters, one of which is shown in FIG. 10 as 280. The station 18 further comprises a plurality of hydraulic actuators 92 including rod extensions 94 arranged to apply external force to the lower ends of the locking rods 50 of the locking means of the carriages 20 for upwardly driving the rods 50, such actuators 92 also serving to downward move the movable platen 80a and its carried bolsters 180. In addition, the station 18 comprises a plurality of hydraulic actuators 96, each positioned to be located adjacent one of the jaw means 64 of a carriage 20 in the station 18, the actuators 96 having their pistons arranged to apply external force to the jaw elements 66 for closing the jaw means 64 around the short portion 60 of the locking rods 50 during the locking of the carriage platens 32, 34.

During the operation of the station 18, pressurized fluid is supplied to the cylinder 84 above the stationary piston 86 to upwardly drive the movable platen 80a whereby the bolsters 180 are upwardly moved between the roller assemblies of the roll case 78 to upwardly propel the lower carriage platen 36 of a partially closed carriage 20 in the station 18 towards the upper carriage platen 32 thereof. The carriage platens 32, 36 are in this manner closed, the actuators 88 upwardly moving the roll case 78 to follow the lower carriage platen 36 up to the level of the track 10 during such closing; and thereafter the upward movement of the movable platen 80a by fluid in the cylinder 84 continues until the upper carriage platen 32 has been upwardly moved a slight distance (for example, one-half inch) to engage the bottom surfaces of the bolsters 230 whereupon the carriage platens 32, 36 are closed and also under clamping force. (As will be noted, at this time the trolley wheels 34 are out-of-engagement with their supporting rails 22, 24.) The actuators 92 are then caused to apply external force to the lower ends of the locking rods 50 of the carriage locking means for upwardly driving such rods 50; and the actuators 96 then interact with the jaws 66 to cause the jaw means 64 to close around the portions 60 of the locking rods 50, thereby locking the carriage 20 with the carriage platens 32, 36 in closed positions. After such locking, the actuators 82 pull the movable platen 80a downwardly to cause the lower carriage platen to be set onto the roller case 78 preparatory to its subsequent discharge to the track 10 where the compression formed articles are cured during the carriage travel therealong. After the carriage 20 has been discharged from the station 18, the roll case 78 is again moved to its position preparatory to receiving a succeeding carriage 20 which for a succeeding operating cycle proceeds in the beforegoing manner.

Figure 7:
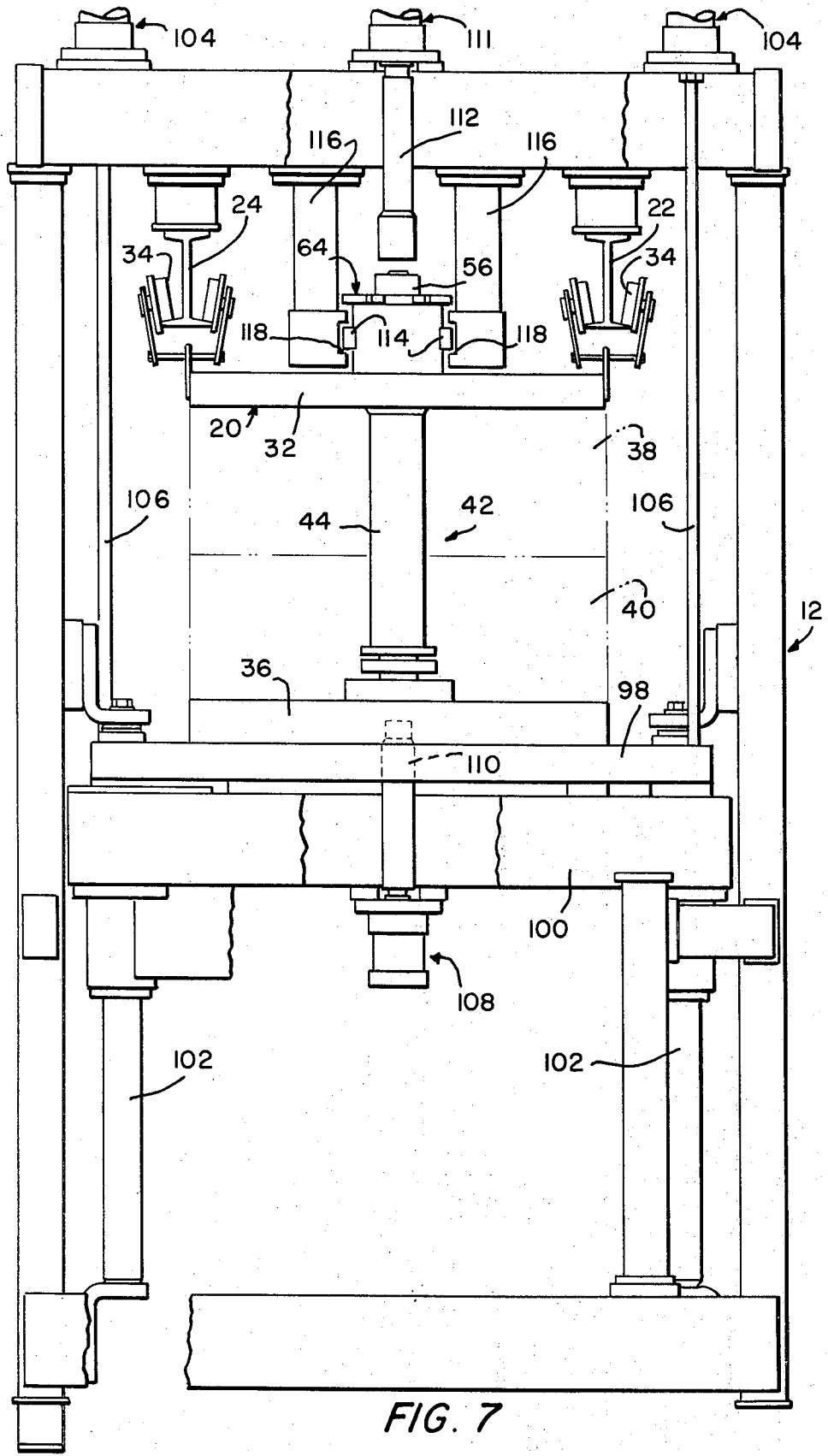
FIG. 7 is an elevational end view, partially broken away and a section, of the mold opening work station of the molding apparatus.

The work station 12 functions as an unlocking station for unlocking the carriage platens 32, 36 containing the cured, compression molded articles and, furthermore, as an opening and discharge station where (1) the carriage platens 32, 36 and their carried mold sections 38, 40 are opened, and (2) the compression molded articles are discharged from the mold sections 38, 40 and manually removed from the apparatus. As shown in FIG. 7, the station 12 comprises a roll case 98 carried by a support frame 100 and, together with such frame 100, vertically movable on generally vertical slide rods 102 by hydraulic actuators (shown fragmentarily as 104) having their piston rod extensions 106 connected to the roll case 98. The roll case 98 contains roller assemblies (not shown) similar in construction to the roller assemblies 30, the roller assemblies of the roll case 98 being selectively rotatably driven for transferring the carriages 20 from the station 12. The frame 100 carries a plurality of hydraulic actuators 108 each including a rod extension 110 arranged for selectively upwardly moving one of the locking rods 50 to raise the thereby carried collar 56 from its corresponding jaw means 64 whereby the latter may be opened by its spring 70. The station 12 further comprises a plurality of hydraulic actuators 111 each including a rod extension 112 above the upper end of one of the locking rods 50, the rod extensions 112 serving to downwardly drive the locking rods 50 during the opening of the carriages 20. The carriages 20 each include a plurality of keys 114 around the upper ends of the upper guide tubes 44: and the station 12 includes downwardly depending elements 116 provided with key-ways 118 receiving the keys 114 and dimensioned to permit relatively small vertical movement (for example vertical movement of around one-half inch) of the keys 114.

The work station 14 represents one or more clean-out stations where open mold sections 38, 40, received from the preceeding work station 12, are cleaned prior to re-transfer to the work station 16.

It will be understood that, if desired, changes could be made in the number and/or functions of the work stations of the apparatus. For example, if desired, the work station 16 could be eliminated and the carriages 20 loaded and completely closed in the succeeding work station 18.

The operation of the beforedescribed molding apparatus is believed to be apparent from the preceeding description. However, to ensure understanding of such operation, a brief summary thereof is hereinafter given with respect to a single operating cycle of one of the carriages 20, the described cycle commencing at the work station 16.

The roll case 72 of the work station 16 in a lowered position receives the carriage 20 from the preceeding clean-out station (or stations) 12 with the platens 32, 36 in their open positions and their carried mold sections 38, 40 resultantly open. The sheets of plastic material to be compression molded are manually inserted between the open mold sections 38, 40 in the station 16. Then, the hydraulic actuator 74 is caused to raise the roll case 72 a predetermined vertical distance to partially close the mold sections 38, 40; and the roller assemblies of the roll case 72 are rotatably driven to transfer the carriage 20 onto the roll case 78 of the work station 18.

In the work station 18, pressurized fluid is supplied to the cylinder 84 above the stationary ram 86 to upwardly drive the frame assembly 80 and the carriage 20, whereby the mold sections 38, 40 carried by the platens 32, 36 of the carriage 20 are closed and pressing force is applied to the mold sections 38, 40. During this upward movement of the carriage platen 36, roll case 78 moves vertically upward to the level of the track 10. While such pressing force is maintained, pressurized fluid is supplied to the hydraulic actuators 92 to upwardly drive the locking rods 50 of the carriage 20 against their springs 54 until the locking collars 56 are above the respective corresponding jaw means 64; and pressurized fluid is supplied to the actuators 96 to cause the latter to close the jaw means 64 around the portions 60 of the locking rods 50 whereupon the pressurized fluid is exhausted from the actuators 92 to permit downward movement of the locking rods 50. Hence, the locking collars 56 are resultantly moved downwardly into frictional engagement with the upper surfaces of the jaw means 64 thereby locking the platens 32, 36 and their carried mold sections 38, 40 in their closed positions. Hydraulic actuators 92 are further pressurized on their rod sides to downwardly drive the movable platen 80 and affixed bolsters 180 thus allowing the bottom surface of locked carriage 20 to rest on the rollers of the roll case 78. The carriage 20 is then transferred onto the track 10 where the compression formed article between the mold sections 38, 40 is cured during the carriage movement therealong; and the roll case 78 is relowered by the hydraulic actuators 88 preparatory to receiving a succeeding carriage 20.

After the compression formed article has been cured, the carriage 20 is received by the roll case 98 of the work station 12. The actuators 108 of the work station 12 are then fluid energized to cause the rod extensions 110 to apply external force to the lower ends of the locking rods 50 of the carriage 20 for raising such locking rods 50, whereby the locking collars 56 are lifted from the jaw means 64 and the springs 70 resultantly open the jaw means 64. The actuators 111 are then energized to cause their rod extension 112 to downwardly drive the locking rods 50 and provide opening of the platens 32, 36 and mold sections 38, 40, while the roll case 98 is moved downwardly. During such opening, the upper platen 32 is permitted a small amount of downward movement by the cooperating keys 114 and keyways 118 but, however, is thereafter prevented from downward movement. During such downward movement also, a knock-out means (not shown) of any suitable conventional construction separates the compression molded article from the mold sections 38, 40, the separated article is subsequently manually discharged from the apparatus; and the open carriage 20 is then transferred to the work station 14 where the open mold sections 38, 40 are cleaned preparatory to re-transfer to the work station 16 and the commencement of another operating cycle 20.

From the preceeding description, it will be seen that the invention provides new and improved means for attaining all of the beforestated objects and advantages. It will be understood, however, that, although only a single embodiment of the invention has been illustrated and hereinbefore described, the invention is not limited merely to this single embodiment, but rather contemplates other embodiments and variations within the scope of the following claims.

Having thus described my invention, I claim:

1. Molding apparatus comprising track means defining a pre-determined path, work station means associated with said track means, and at least one carriage means movable along said track means and through said work station means, said carriage means including upper and lower platens relatively vertically movable between open and closed positions, said carriage means including at least one telescoping tube means extending generally vertically between said platens and interconnecting said platens for their said relative movement, said telescoping tube means comprising a telescoping tubular member mounted to each said platen, and said carriage means further including locking means for locking said platens in their said closed positions, said locking means comprising a plurality of jaw members associated with one of said platens and relatively movable between open positions and closed positions wherein said jaw members are cooperative to extend around a therebetween element, first spring means connected to said jaw members biasing said jaw members to their said open positions and yieldable upon application of external force to said jaw members for permitting relative movement of said jaw members to their said closed positions, locking rod means mounted adjacent one of its ends to the other of said platens and longitudinally extending generally vertically in said telescoping tube means from said other platen towards said one platen, said locking rod means being of length to have its other end contained within said telescoping tube means when said platens are in their said open positions and external to said telescoping tube means when said platens are in their said closed positions, said locking rod means being axially slidably movable relative to said platens and being operatively associated with said jaw members to have its said other end between said jaw members when said platens are in their said closed positions, second spring means associated with said locking rod means adjacent its said one end for axially biasing said locking rod means from said one platen, locking collar means carried by said locking rod means adjacent its said other end engagable with said jaw members for retaining said jaw members in their closed positions around said locking rod means, and retaining collar means carried by said locking rod means spaced from said locking collar means by only a minor portion of the length of said locking rod means, said retaining collar means limiting axial movement of said locking rod means away from said one platen.

2. Molding apparatus according to claim 1, wherein said second spring means comprises a mechanical spring, said retaining collar means is cooperative with the tubular member which is connected to said other platen for limiting the axial movement of said locking rod means and pre-loading said mechanical spring, and further comprising bearing means intermediate said retaining collar means and such tubular member, retaining means carried by said one end of said locking rod means for limiting axial movement of said locking rod means towards said one platen, and link means interconnecting said jaw members for causing said jaw members to move in unison against said first spring means.

3. Molding apparatus according to claim 1, wherein said carriage means includes a plurality of said locking means.

4. Molding apparatus according to claim 1, wherein said track means includes adjacent straight and curved sections on which said carriage means rides during its movement along said track means, and said straight and curved sections are relatively arranged to prevent their simultaneous engagement with said carriage means during its movement thereover.

5. Molding apparatus according to claim 4, wherein said straight and curved sections of said track means are in different planes.

6. Molding apparatus according to claim 1, wherein said work station means includes a first work station comprising means for axially moving said locking rod means for locking of said platens, and a second work station including means for axially moving said locking rod means for unlocking of said platens.

7. Molding apparatus according to claim 6, wherein said first work station further includes means for causing said jaw members to be moved to their said closed positions.

8. Molding apparatus according to claim 1, wherein said work station means comprises a pressing station including means for exerting pressing force on said platens and also including means for axially moving said locking rod means for locking of said platens, and an opening station including means for axially moving said locking rod means for unlocking of said platens and also including means for relatively moving said platens to their said open positions, said pressing and opening stations being substantially spaced along said track means in the direction of the movement of the carriage means along the latter.

9. Molding apparatus according to claim 8, wherein said work station means includes at least one cleaning station intermediate said opening and pressing stations.

10. Molding apparatus according to claim 8, wherein said opening station and said carriage means include means cooperative for permitting only limited movement of one of said platens during said relative movement of said platens.

11. Molding apparatus according to claim 8, wherein said track means includes adjacent straight and curved sections on which said carriage means rides during its said movement along said track means, said straight and curved sections being relatively arranged to prevent their simultaneous engagement with said carriage means during its movement thereover.

12. Molding apparatus according to claim 11, wherein said straight and curved sections of said track means are in different planes.

13. Carriage means for use in molding apparatus including track means defining a pre-determined path and work station means associated with said track means, said carriage means including upper and lower platens relatively vertically movable between open and closed positions, at least one telescoping tube means extending generally vertically between said platens and interconnecting said platens for their said relative movement, said telescoping tube means comprising a telescoping tubular member mounted to each said platen, and said carriage means further including locking means for locking said platens in their said closed positions, said locking means comprising a plurality of jaw members associated with one of said platens and relatively movable between open positions and closed positions wherein said jaw members are cooperative to extend around a therebetween element, first spring means connected to said jaw members biasing said jaw members to their said open positions and yieldable upon application of external force to said jaw members for permitting relative movement of said jaw members to their said closed positions, locking rod means mounted adjacent one of its ends to the other of said platens and longitudinally extending generally vertically in said telescoping tube means from said other platen towards said one platen, said locking rod means being of length to have its other end contained within said telescoping tube means when said platens are in their said open positions and external to said telescop-ing tube means when said platens are in their said closed positions, said locking rod means being axially slidably movable relative to said platens and being operatively associated with said jaw members to have its said other end between said jaw members when said platens are in their said closed positions, second spring means associated with said locking rod means adjacent its said one end for axially biasing said locking rod means from said one platen, locking collar means carried by said locking rod means adjacent to its said other end engagable with said jaw members for retaining said jaw members in their closed positions around said locking rod means, and retaining collar means carried by said locking rod means spaced from said locking collar means by only a minor portion of the length of said locking rod means, said retaining collar means limiting axial movement of said locking rod means away from said one platen.

14. Carriage means according to claim 13, comprising a plurality of said locking means.

15. Molding apparatus according to claim 13, wherein said second spring means comprises a mechanical spring, said retaining collar means is cooperative with the tubular member which is connected to said other platen for limiting the axial movement of said locking rod means and pre-loading said mechanical spring, and further comprising bearing means intermediate said retaining collar means and such tubular member, retaining means carried by said one end of said locking rod means for limiting axial movement of said locking rod means towards said one platen, and link means interconnecting said jaw members for causing said jaw members to move in unison against said first spring means.

* * * * *